(12) United States Patent
Nagy (10) Patent No.: US 11,285,989 B2
(45) Date of Patent: Mar. 29, 2022

(54) STEERING COLUMN FOR A MOTOR VEHICLE

(71) Applicants: Thyssenkrupp Presta AG, Eschen (LI); Thyssenkrupp AG, Essen (DE)

(72) Inventor: Balint Kalman Nagy, Montlingen (CH)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 0 days.

(21) Appl. No.: 17/047,110

(22) PCT Filed: May 27, 2019

(86) PCT No.: PCT/EP2019/063607
§ 371 (c)(1),
(2) Date: Oct. 13, 2020

(87) PCT Pub. No.: WO2019/228960
PCT Pub. Date: Dec. 5, 2019

(65) Prior Publication Data
US 2021/0146987 A1  May 20, 2021

(30) Foreign Application Priority Data
May 29, 2018  (DE) ................... 10 2018 112 837.1

(51) Int. Cl.
*B62D 1/184* (2006.01)
*B62D 1/185* (2006.01)
*B62D 1/19* (2006.01)

(52) U.S. Cl.
CPC ............. *B62D 1/184* (2013.01); *B62D 1/185* (2013.01); *B62D 1/19* (2013.01)

(58) Field of Classification Search
CPC ........... B62D 1/184; B62D 1/185; B62D 1/19
See application file for complete search history.

(56) References Cited

U.S. PATENT DOCUMENTS

| 5,161,425 A | 11/1992 | Baskett |
| 5,520,416 A * | 5/1996 | Singer, III ............. B62D 1/181 280/775 |

(Continued)

FOREIGN PATENT DOCUMENTS

| DE | 101 30 587 A | 1/2002 |
| DE | 10 2015 204 894 A | 9/2016 |

(Continued)

OTHER PUBLICATIONS

English Translation of International Search Report issued in PCT/EP2019/063607, dated Aug. 22, 2019.

*Primary Examiner* — Drew J Brown
(74) *Attorney, Agent, or Firm* — thyssenkrupp North America, LLC (57) ABSTRACT

A steering column has an actuating unit and retaining unit. A clamping device includes a clamping lever and a clamping shaft which are rotationally coupled and the clamping shaft has a cam which is connected to the clamping shaft in a rotationally fixed manner. A fixing device includes an arresting element and is arranged in the retaining unit. An engagement element is connected to the actuating unit. The cam and a guide track of the arresting element such that the arresting element can be brought into engagement with the engagement element by a rotary movement of the cam. The guide track has a first ramp region, a second ramp region and, situated therebetween, a transition region starting from which the ramp regions are formed, wherein the first ramp region is designed as a rising ramp, and the second ramp region comprises a falling ramp.

19 Claims, 3 Drawing Sheets

(56) References Cited

U.S. PATENT DOCUMENTS

| | | | | |
|---|---|---|---|---|
| 10,023,222 B2* | 7/2018 | Tinnin | .................. | B62D 1/192 |
| 10,759,465 B2* | 9/2020 | Ganahl | ................. | B62D 1/184 |
| 10,787,191 B2* | 9/2020 | Kreutz | ................ | B62D 5/0409 |
| 10,960,917 B2* | 3/2021 | Schnitzer | ............... | B62D 1/195 |
| 10,974,757 B2* | 4/2021 | Raich | ................... | B62D 1/185 |
| 11,104,368 B2* | 8/2021 | Bueker | ................. | B62D 1/184 |
| 2018/0037250 A1 | 2/2018 | Kreutz | | |
| 2019/0176870 A1 | 6/2019 | Ganahl | | |
| 2020/0207403 A1* | 7/2020 | Kirmsze | ............... | B62D 1/195 |
| 2020/0317251 A1* | 10/2020 | Munding | .............. | B62D 1/192 |
| 2021/0024121 A1* | 1/2021 | Matsuno | ............... | B62D 1/185 |

FOREIGN PATENT DOCUMENTS

| | | |
|---|---|---|
| DE | 10 2016 214 709 A | 2/2018 |
| EP | 2 048 031 A | 4/2009 |
| EP | 2 923 921 A | 9/2015 |
| FR | 2 817 528 B | 6/2002 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/063607, filed May 27, 2019, which claims priority to German Patent Application No. DE 10 2018 112 837.1, filed May 29, 2018, the entire contents of both of which are incorporated herein by reference.

FIELD

The present disclosure generally relates to a steering column for a motor vehicle.

BACKGROUND

Steering columns for motor vehicles are generally known in which a steering wheel position can be adapted to the sitting position of the driver of a motor vehicle. For this purpose, the steering column has a steering spindle to which a steering wheel is fastened. Here, the steering column is substantially adjustable in such a way that the steering wheel can be positioned in the vehicle interior by a length adjustment in the longitudinal direction of the steering column. To fix the steering spindle with the steering wheel at the desired position, the steering column has a clamping device.

A steering column with a clamping device is known for example from DE 10 2016 214 709 A1 stated at the outset. Here, the steering column comprises a casing unit and an inner casing tube in which a steering spindle is rotatably mounted. The inner casing tube is telescopically adjustable in the direction of the longitudinal axis of the steering spindle and can be fixed in different steering wheel positions by means of a releasable clamping device. The casing unit is held on the body of the motor vehicle. The clamping device has an engagement part and an arresting part. The engagement part is coupled to the inner casing tube. The arresting part is displaceably arranged in the casing unit. The arresting part can be connected to the engagement part in a form-fitting manner. Furthermore, the clamping device has a cam and a clamping bolt which is rotatably mounted in the casing unit. Here, the cam is connected to the clamping bolt in such a way that it interacts with the arresting part through a rotational movement.

The arresting part is lifted by the rotary movement of the cam. This corresponds to a release position for setting the steering wheel position. In the release position, the arresting part and the engagement part are decoupled from one another. For lifting and lowering the arresting part, the arresting part has a cam track. Here, the cam interacts with the cam track of the arresting part to fix or release the steering spindle. The cam track is here formed on the arresting part in such a way as to assist lifting of the arresting part to adjust the steering wheel position. The arresting part has moreover a horizontal surface with which the cam is in contact in the release position.

It is a disadvantage here that the cam and hence the operating lever, which is connected to the cam in a rotationally fixed manner, are connected to the arresting part in the release position only in a force-fitting manner. The fixing or the retaining of the operating lever in the release position occurs here purely in a force-fitting manner. The operating lever is not fixed in a positionally fixed manner here. Furthermore, during transfer of the arresting element into the release position, the horizontal surface produces a degraded handling feel of the operating lever. Furthermore, by virtue of the horizontal surface, the arresting part is not securely fixed in the release position or the lifted position.

Thus a need exists for a steering column for a motor vehicle in which, by means of an improved fixing device, length adjustability of the steering column can be realized in a quick and simple manner with improved handling of the operating lever.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle.

The invention is based on the idea of specifying a steering column for a motor vehicle, comprising an actuating unit having at least one casing tube in which
a steering spindle is mounted so as to be rotatable about
a longitudinal axis of the casing tube, a retaining unit which can be connected to the body of the motor vehicle and in which the actuating unit is displaceably arranged, at least one clamping device by means of which the actuating unit can be fixed with respect to the retaining unit. The clamping unit comprises at least one clamping lever and at least one clamping shaft which are coupled to one another in a rotationally fixed manner. The clamping shaft has at least one cam which is connected to the clamping shaft in a rotationally fixed manner, at least one fixing device which comprises at least one arresting element, which is arranged in the retaining unit, and at least one engagement element which is connected to the actuating unit. Here, the cam corresponds with a guide track of the arresting element in such a way that the arresting element can be brought into engagement with the engagement element by a rotary movement of the cam.

The guide track has a first ramp region, a second ramp region and, situated therebetween, a transition region starting from which the ramp regions are formed. The first ramp region is designed as a rising ramp, and the second ramp region comprises a falling ramp.

In a fixing position, the arresting element is coupled to the engagement element so as to be fixed against displacement. The arresting element is situated in this case in a lowered state in which the arresting element is connected to the engagement element in a force-fitting and/or form-fitting manner. The arresting element can be lifted by a rotary movement of the cam. The arresting element can here be decoupled from the engagement element. If the arresting element is lifted, this corresponds to a release position of the arresting element. In the release position of the arresting element, the actuating unit is displaceable with respect to the retaining unit.

The cam interacts with the guide track of the arresting element during the transfer of the arresting element from the fixing position into the release position. In particular, the cam has a cam contour interacting with the first ramp region of the guide track to transfer the arresting element from the fixing position into the release position. Here, the cam interacts with the first ramp region of the guide track in such a way that the arresting element is lifted.

The rising ramp of the first ramp region is referred to as a rising ramp since this ramp allows the arresting element to be lifted in interaction with the cam. From a geometric viewpoint, the rising ramp, starting from the transition region, is equally of rising form.

The falling ramp is referred to as a falling ramp since this ramp allows the arresting element to be lowered in interaction with the cam. Here, from a geometric viewpoint, the falling ramp, starting from the transition region, is of geometrically rising form.

The rising ramp of the first ramp region and the falling ramp of the second ramp region are thus of geometrically rising form starting from the transition region.

The invention has various advantages. The rising ramp of the first ramp region is of rising form starting from the transition region. The first ramp region allows jerk-free release or lifting of the arresting element with a substantially uniform release force. Furthermore, the falling ramp of the second ramp region is of geometrically rising form starting from the transition region. In other words, the gradient of the rising ramp of the first ramp region is opposite to the gradient of the falling ramp of the second ramp region, with the result that the value of the gradient of the rising ramp has an opposite sign to the value of the gradient of the falling ramp. Consequently, the value of the one gradient is positive and the value of the other gradient is negative. The terms "falling" and "rising" are thus to be understood as meaning that the ramps have gradients of different signs. The transition region has a point in which the gradient assumes the value zero and thus forms an extreme point, in which the movement direction of the arresting element is reversed, and thus forms a dead center. The values of the gradient of a, for example, curved ramp can be determined by means of a tangent applied to a respective point of the ramp and determining the gradient of the tangent, or by a mathematical differentiation of an equation which determines the guide track of the ramp, as is known to a person skilled in the art from the mathematical subfield of analysis.

The falling ramp advantageously assists opening of the clamping lever. The transition region here forms a force inflexion point starting from which the cam can be transferred into the release position of the arresting element with reduced release force.

The invention has the further advantage that, by virtue of the falling ramp, the clamping lever and hence the arresting element are fixed in the release position. The falling ramp thus allows improved fixing of the clamping lever and of the arresting element in the release position. Furthermore, the arresting element can be transferred in a quick and simple manner from the fixing position into the release position and from the release position into the fixing position. It is also advantageous that, upon lifting of the arresting element, handling of the clamping lever is improved by means of the falling ramp.

Preferred embodiments of the invention are specified in the dependent claims.

In a particularly preferred embodiment, the rising ramp and the falling ramp have an angle $\beta$ to one another which is less than 150°. The first ramp region and the second ramp region thus preferably have an angle $\beta$ to one another which is less than 150°. The rising ramp of the first ramp region and the falling ramp of the second ramp region are formed at an angle $\beta$ to one another starting from the transition region. The angle $\beta$ between the rising ramp and the falling ramp is preferably from 80° to 140°. In other words, the first ramp region and the second ramp region preferably have an angle $\beta$ to one another which is between 80° and 140°.

The rising ramp can have a larger gradient than the falling ramp. What is to be understood by gradient here is a gradient angle from a horizontal reference plane which lies tangentially on the transition region. The gradient angle is measured here between the rising ramp and the reference plane. Furthermore, the gradient angle of the second falling ramp is likewise measured between the latter and the reference plane. In other words, the amount of the value of the gradient of the rising ramp can be greater than the amount of the value of the gradient of the falling ramp.

The gradient angle of the rising ramp of the first ramp region with respect to the reference plane can thus be larger than the gradient angle of the falling ramp of the second ramp region with reference to the reference plane. It is equally also possible for the gradient angle of the rising ramp of the first ramp region with respect to the reference plane to be smaller than the gradient angle of the falling ramp of the second ramp region with respect to the reference plane. It is advantageous here that lifting or release of the arresting element from the engagement element is facilitated by virtue of the angle $\beta$, which is less than 150°. It is also advantageous that the arresting element and hence the clamping lever can be fixed in an improved manner in the release position.

In a further preferred embodiment, the second ramp region has a second rising ramp. The second rising ramp is here referred to as a rising ramp since this ramp allows the arresting element in interaction with the cam to be lifted to a small degree. From a geometric viewpoint, the second rising ramp is equally of geometrically rising form on the arresting element. The falling ramp and the second rising ramp of the second ramp region are arranged at a free end of the arresting element. The falling ramp is here of geometrically rising form starting from the transition region. The falling ramp of the second ramp region is formed on the arresting element in such a way that the second rising ramp together with the falling ramp forms a material indentation at the free end of the arresting element. The second rising ramp advantageously allows improved fixing of the cam in the release position of the arresting element. The clamping lever is thus held in a positionally fixed manner in the release position.

In the following description, the rising ramp of the first ramp region will be referred to as first rising ramp. Therefore, the first rising ramp corresponds to the rising ramp of the first ramp region.

There is preferably provided a spring element which preloads the arresting element. The spring element can be arranged on the retaining unit. The spring element can be arranged on the retaining element in such a way that the spring element is fixedly connected to the retaining unit at a free end. The fixed connection between the spring element and the retaining unit can be formed in a form-fitting and/or force-fitting and/or integrally bonded manner. The spring element can be formed by a spring tongue. The spring element can be formed by a spring bar. Furthermore, the spring element can be formed by a leaf spring. The spring can also be formed by a spiral spring or a disk spring. The spring element can furthermore be formed by a nonstated spring type. The spring element can form a positive lock spring such that the arresting element is preloaded in the engagement direction and secure engagement with the engagement element is brought about.

The spring element preferably acts on the arresting element for preloading the arresting element. Furthermore, the spring element can lie against the arresting element for preloading the arresting element. The arresting element is preloaded against the engagement element by the spring element. The spring element thus brings about preloading of the arresting element in the direction of the engagement element. This advantageously makes it possible for the arresting element to engage securely in the engagement element. In other words, the arresting element can be transferred into the fixed position by the spring element. The spring element preloads the arresting element in such a way that secure closing of the clamping lever and hence secure transfer of the arresting element into the fixed position are achieved. In a crash situation, it is advantageous here that the arresting element, by virtue of the spring element, latches securely and quickly into the engagement element in a tooth-on-tooth situation or remains latched in the engagement element. What is to be understood by the tooth-on-tooth situation is that the tooth tips of the arresting element rest on the tooth tips of the engagement element and the teeth are still not completely in engagement. In the case of a minimum displacement in the crash situation of the engagement element with respect to the arresting element, the engagement of the arresting element in the engagement element occurs by virtue of the spring element.

With further preference, the arresting element has a material projection on which the spring element acts. The spring element can act on the material projection in such a way that the arresting element is preloaded against the engagement element. The material projection can here be formed by a material bulge of the arresting element. The material projection can also be formed by a material edge of the arresting element. The material projection can be formed integrally with the arresting element. Furthermore, the material projection can be formed by a separate preloading element. The preloading element can here be formed by a screw. Furthermore, the preloading element can be formed by a pin or a bolt. The preloading element can be at least partially embedded in the arresting element. The material projection is preferably arranged on a material step of the arresting element. The material projection can here be arranged centrally on the arresting element. The material projection is formed in such a way that improved introduction of spring force into the arresting element is made possible for preloading against the engagement element. This advantageous ensures a displacement-fixed coupling of the arresting element with the engagement element. The arresting element can thus be fixedly connected to the engagement element in the fixing position.

In a preferred embodiment, the material projection is formed in such a way that the spring element is in point contact and/or in linear contact with the arresting element. It is advantageous here that improved introduction of spring force of the spring element into the arresting element is made possible for preloading against the engagement element. This ensures improved fixing of the arresting element in the fixing position, as a result of which the clamping lever is held in a positionally fixed manner in the fixing position of the arresting element or in the closing position of the clamping lever.

In a preferred embodiment, the arresting element has at least one first form-fitting means, and the engagement element has at least one second form-fitting means. The form-fitting means can be brought into mutual engagement by a stroke movement of the arresting element. The first form-fitting means of the arresting element can here be formed by a toothing. The second form-fitting means of the engagement element can likewise be formed by a toothing.

Furthermore, the form-fitting means of the arresting element and of the engagement element can also have some other nonstated form. The first form-fitting means and the second form-fitting means can be designed to be complementary to one another. The first form-fitting means of the arresting element and the second form-fitting means of the engagement element are designed in such a way that the arresting element can be connected to the engagement element in a form-fitting manner. In the case of a form-fitting connection of the arresting element with the engagement element, the arresting element is situated in the fixing position in which no length adjustment of the steering column is possible in normal operation. In the release position of the arresting element, the first form-fitting means of the arresting element and the second form-fitting means of the engagement element are brought out of engagement. In other words, in the release position, the arresting element is decoupled from the engagement element in terms of the form fit. The arresting element can be connectable by the first form-fitting means to the second form-fitting means of the engagement element in a force-fitting and/or form-fitting manner. The form-fitting means advantageously form a structurally simple solution for connecting the arresting element to the engagement element.

The arresting element can preferably be releasably connected to the engagement element in a force-fitting and form-fitting manner. It is advantageous here for the force-fitting and form-fitting connection to prevent inadmissible lifting of the arresting element from the engagement element in the coupled state.

In a particularly preferred embodiment, the cam has a first cam contour and a second cam contour which interacts with the first ramp region for securely decoupling the arresting element from the engagement element. The first cam contour is preferably formed on the cam in such a way that the first cam contour tangentially adjoins a circumference of the cam. The second cam contour can be formed here in such a way that the second cam contour can be brought into contact, in particular into linear contact, with the first ramp region of the arresting element. The second cam contour can be formed on the cam in such a way that the second cam contour forms a material constriction on the cam. The cam can be of asymmetrical design. The cam can also have a symmetrical cam shape. During decoupling of the arresting element from the engagement element, the second cam contour makes it possible for a release force to be introduced into the arresting element in an improved manner. This facilitates lifting or decoupling of the arresting element from the engagement element. Quick and secure transfer of the arresting element from the fixing position into the release position is thus made possible.

In one embodiment, the engagement element is connected to the actuating unit with the interposition of an energy absorption device. The engagement element can be connected to the energy absorption device in such a way that, in a crash situation, kinetic energy resulting from a vehicle occupant striking the steering wheel is taken up by the energy absorption device. It is advantageous here that a risk of injury to the vehicle occupant is reduced by the energy absorption device. The energy absorption device preferably comprises an energy absorption element which is plastically deformable in the crash situation. Furthermore, the energy absorption device can have a breakaway element, for example a shear pin or a shear rivet, which connects the engagement element and the actuating unit to one another in normal operation and breaks in the crash situation as a result of a first impulse applied to the steering wheel by the vehicle occupant and thus allows the movement between the actuating unit and engagement element with the deformation of the energy absorption element.

Figure 1:
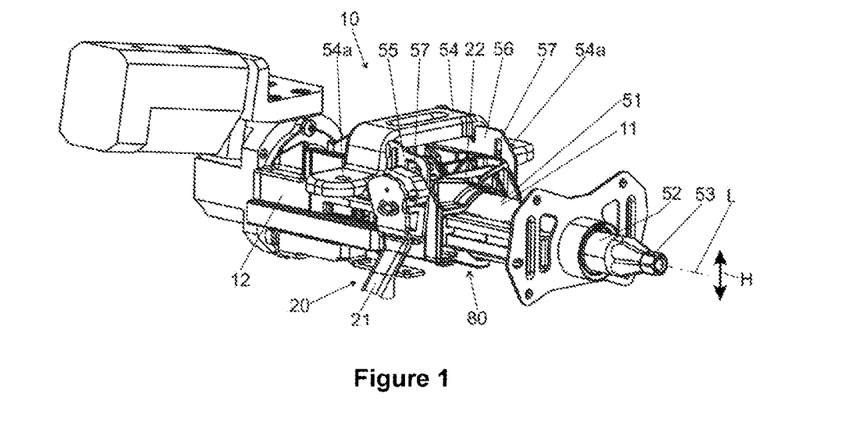
FIG. 1 is a perspective view of a steering column having a retaining element according to a preferred exemplary embodiment.

FIG. 1 shows a perspective view of a steering column 10 according to an exemplary embodiment according to the invention. The steering column 10 comprises an actuating unit 11, a retaining unit 12 and a clamping device 20. The steering column 10 can be fastened to a body of a motor vehicle (not shown) by means of the retaining unit 12. The retaining unit 12 has a retaining element 54 in the form of a bracket by means of which the steering column 10 can be connected to the body of the motor vehicle. The retaining element 54 comprises fastening means 54a for connection to the body. Furthermore, the retaining element 54 has side cheeks 55, 56 which are spaced apart from one another. The side cheeks 55, 56 are here arranged with respect to one another in such a way that the retaining unit 12 can be received between the side cheeks 55, 56. The actuating unit 11 is arranged in the retaining unit 12.

The actuating unit 11 comprises a steering spindle 52 and a casing tube 51. The steering spindle 52 and the casing tube 51 have a common longitudinal axis L. Here, the steering spindle 52 is arranged mounted in the casing tube 51 so as to be rotatable about the longitudinal axis L. The steering spindle 52 has a rear end 53 at which a steering wheel (not shown) can be fitted to the steering spindle 52. The casing tube 51 is held in a receptacle of the retaining unit 12.

The clamping device 20 can be brought into a locking position or into a release position by manual actuation of a clamping lever 21. Here, in the release position, the casing tube 51 is telescopically displaceable within the retaining unit 12 for length adjustment in the direction of the longitudinal axis L. Furthermore, the retaining unit 12 is height-adjustable in a height direction H relative to the retaining element 54 according to the arrow directions, as shown in FIG. 1, in which the retaining unit 12 is pivotable about a pivot axis. In the locking position, the casing tube 51 is fixed in the direction of the longitudinal axis L, and the retaining unit 12 is fixed in the height direction H. The locking position corresponds to the normal operation of the steering column 10. In normal operation, it is ensured that the set steering wheel position cannot be changed under the forces customarily acting on the steering spindle 52 via the steering wheel.

Figure 2:
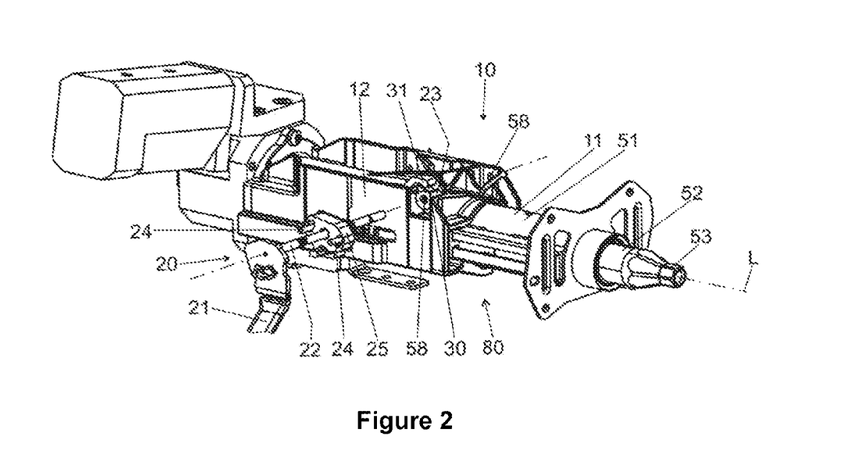
FIG. 2 is a perspective view of the steering column as per FIG. 1 without the retaining element.

As shown in FIG. 2, the clamping device 20 has a clamping lever 21, a clamping shaft 22 and a cam 23. The clamping lever 21 is connected to the clamping shaft 22 in a rotationally fixed manner. The clamping shaft 22 is guided transversely to the longitudinal axis L through oblong holes 57 in the mutually opposite side cheeks 55, 56 and through a through-opening of the retaining unit 12. The clamping device 20 here comprises a generally known clamping mechanism with a tilting pin arrangement 24 and a support disk 25.

The tilting pin arrangement 24 is connected to the clamping shaft 22 in a rotationally fixed manner. Furthermore, the support disk 25 is connected, opposite the tilting pin arrangement 24, to the side cheek 55 in a rotationally fixed manner. Rotating the clamping lever 21 and the clamping shaft 22 connected thereto causes the support disk 25 to be displaced axially relative to the clamping lever 21 and the clamping shaft 22. The support disk 25 is thus pressed from outside against the side cheek 55. The clamping shaft 22 is mounted on the oppositely arranged side cheek 56 so as to be fixed against axial displacement, for example by means of a hexagon nut which acts as an abutment and which has an internal thread and is screwed onto an external thread of the clamping shaft 22. If therefore the two side cheeks 55, 56 are moved toward one another, the retaining unit 12 arranged therebetween is tightly clamped in a force-fitting manner. Instead of the tilting pin arrangement 24, 25 shown, use can also be made of other mechanisms for converting the rotary movement into a clamping movement, such as for example a wedge disk-cam disk clamping device.

The clamping shaft 22 is guided through openings 58 in the retaining unit 12 that are arranged opposite one another transversely to the longitudinal axis L. In a similar manner to a clamping sleeve or a clamp, the retaining unit 12 is of slotted design between the openings 58 in the longitudinal direction. With the described bracing of the side cheeks 55, 56 by the clamping force, the retaining unit 12 is thus compressed transversely to the longitudinal axis L. The locking position is set here, with the casing tube 51 being tightly clamped in the retaining unit 12 in a force-fitting manner. The retaining unit 12 has a slot in the direction of the longitudinal axis L which is formed in the region of the clamping shaft 22. In the locking position, the slot has a reduced width on account of the acting clamping force by comparison with the release position. The casing tube 51 is tightly clamped in the retaining unit 12 by virtue of this reduced width. The narrowing of the slot of the retaining unit 12 is accompanied by a reduction in the inside diameter of the bore of the retaining unit 12 in which the actuating unit 11 is received.

Figure 3:
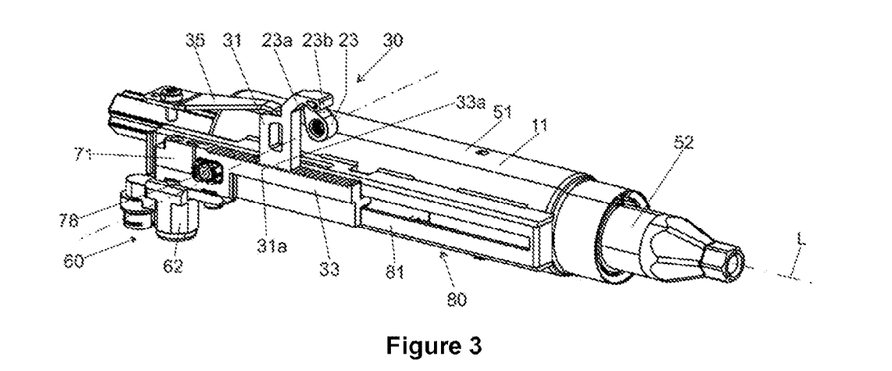
FIG. 3 is a perspective view of an actuating unit, a clamping device and a fixing device of the steering column as per FIG. 1.

According to FIG. 3, a perspective view of an actuating unit 11 as described above is shown. Furthermore, FIG. 3 shows a fixing device 30, a coupling device 60 and an energy absorption device 80.

The fixing device 30 has an arresting element 31 and an engagement element 33. The arresting element 31 is mounted fixedly against displacement in the retaining unit 12 in the direction of the longitudinal axis L. In the height direction H, the arresting element 31 is mounted in a height-adjustable manner to set the locking position or the release position of the clamping lever 21. In other words, the arresting element 31 is arranged in the retaining unit 12 in such a way that the arresting element 31 is displaceable in the height direction H in the retaining unit 12. The engagement element 33 is connected to the casing tube 51 via an energy absorption device 80. The arresting element 31 and the engagement element 33 have form-fitting means 31a, 33a. The form-fitting means 31a, 33a can be brought into form-fitting engagement by a stroke movement of the arresting element 31. The configuration of the arresting element 31, of the engagement element 33 and of the form-fitting means 31a, 33a will be discussed in more detail later.

The retaining unit 12 further has a spring element 35 for preloading the arresting element 31. Here, the arresting element 31 is pressed against the engagement element 33 by the spring element 35. The form-fitting means 31a, 33a of the arresting element 31 and of the engagement element 33 can be held in form-fitting engagement by the spring element 35. The locking position of the clamping device 20 corresponds here to a fixing position of the arresting element 31. In the fixing position of the arresting element 31, the arresting element 31 is connected, in particular in a form-fitting manner, to the engagement element 33 so as to be fixed against displacement in the direction of the longitudinal axis L. In the release position of the clamping device 20, the arresting element 31 is decoupled from the engagement element 33. This corresponds to the release position of the arresting element 31. The transfer of the arresting element 31 from the fixing position into the release position will be discussed in more detail later in FIG. 5, FIG. 7 and FIG. 8.

As described above, the clamping device 20 has a cam 23. The cam 23 is connected to the clamping shaft 22 in a rotationally fixed manner as per FIG. 2. In order to lift the arresting element 31, the cam 23 interacts with the arresting element 31 in a force-transmitting manner. The cam 23 will be discussed in more detail later.

Figure 4:
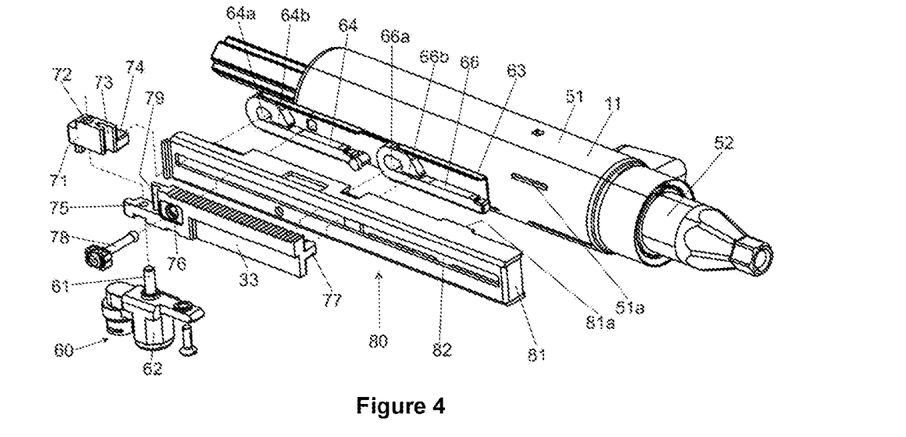
FIG. 4 is a perspective exploded view of the actuating unit and of an energy absorption device of the steering column as per FIG. 1.

According to FIG. 3 and FIG. 4, the engagement element 33 has a connecting part 71. The connecting part 71 forms a separate part which is connected to the engagement element 33 by a coupling device 60. The actuation of the coupling device 60 allows the mechanical connection between the engagement element 33 and the connecting part 71 to be released. Here, the connecting part 71 is separated from the engagement element 33, with the connecting part 71 and the engagement element 33 being moved independently of one another in the longitudinal direction L.

The coupling device 60 comprises a pin-shaped coupling element 61. The pin-shaped coupling element 61 is mounted on a pyroelectric actuator 62. Upon actuation of the actuator 62, a pyrotechnic propellant charge is ignited by means of which the coupling element 61 is moved in the direction of the actuator 62.

The actuator 62 is fastened to the engagement element 33. The coupling element 61 extends here transversely to the longitudinal axis L through a form-fitting opening 75 of the engagement element 33 and through a further form-fitting opening 72 of the connecting part 71. The form-fitting openings 72, 75 are arranged coaxially to one another. If the coupling element 61 engages in the form-fitting opening 72, 75, the connecting part 71 and the engagement element 33 are connected to one another in a form-fitting manner. Consequently, upon an introduction of force via the arresting element 31 in a crash situation of the motor vehicle, the engagement element 33 and the connecting part 71 are moved jointly in the direction of the longitudinal axis L.

If the coupling device 60 is ignited, the actuator 62 moves the coupling element 61 out of the form-fitting opening 72 such that a decoupled state is assumed. In the decoupled state, the engagement element 33 is mechanically separated from the connecting part 71. It is also the case that, in the decoupled state, with an introduction of force via the arresting element 31 in a crash situation of the motor vehicle, only the engagement element 33 is carried along relative to the casing tube 51 in the longitudinal direction. The connecting part 71 remains with respect to the casing tube 51 in a rest position.

The connecting part 71 has a first positioning element 73 in the form of a groove which is open in the longitudinal direction. Into the groove there can be inserted a second positioning element 79, in the form of a fitting projection, which is formed on the engagement element 33. As a result, the engagement element 33 and the connecting part 71 are positioned relative to one another in a form-fitting manner transversely to the longitudinal direction.

The engagement element 33 has a fastening opening 76 through which a predetermined breaking element in the form of a shear bolt 78 is guided. The shear bolt 78 is fixedly connected to the casing tube 51. Furthermore, the engagement element 33 is held on the energy absorption device 80 by the shear bolt 78.

The energy absorption device 80 is arranged on the casing tube 51. The energy absorption device 80 has a housing in the form of a retaining profile 81. The retaining profile 81 is C-shaped in form. The retaining profile 81 can be formed by a C-shaped rail. The retaining profile 81 is fixedly connected to the casing tube 51. Furthermore, the retaining profile 81 extends in the longitudinal direction of the casing tube 51, with the open cross section of the retaining profile 81 being directed toward an outer side of the casing tube 51. The retaining profile 81 is fixedly connected to the casing tube 51 by form-fitting elements 81a. The form-fitting elements 81a engage in corresponding receiving openings 51a of the casing tube 51 for the form-fitting connection of the retaining profile 81. The retaining profile 81 can be connected to the casing tube 51 by welding, in particular laser welding. The retaining profile 81 has a slot 82 on an outwardly directed outer side. The slot 82 extends here parallel to the longitudinal axis L of the casing tube 51.

A likewise C-shaped inner profile 63 is arranged in the retaining profile 81. The inner profile 63 extends in the direction of the longitudinal axis L and is designed to be outwardly open toward the retaining profile 81. The inner profile 63 can be fixedly connected to the casing tube 51. Here, the inner profile 63 can be connected to the casing tube 51 by welding. Furthermore, the inner profile 63 can be formed by a spring steel sheet.

As shown in FIG. 4, energy absorption elements 64, 66 are arranged spaced apart from one another in the inner profile 63. The energy absorption elements 64, 66 are here each configured as U-shaped bending wires, in particular bending strips. The respective energy absorption element 64, 66 has a first leg connected to a second leg via a bend of 180°. A driver hook 64b, 66b is in each case formed at the end of the second leg by a bend toward the first leg. The energy absorption elements 64, 66 can be formed as stamped parts.

As is clearly evident in FIG. 4, the engagement element 33 has a first driver element 77, and the connecting part 71 has a second driver element 74. The engagement element 33 and the connecting part 71 are arranged on the retaining profile 81. The engagement element 33 and the connecting part 71 are arranged on the retaining profile 81 in such a way that the driver elements 74, 77 engage through the slot 81 into the engagement openings 64a, 66a of the energy absorption elements 64, 66. The engagement element 33, guided in the longitudinal direction parallel to the longitudinal axis L in the slot 82 of the retaining profile 81, can thus engage by the first driver element 77 behind the driver hook 66b of the energy absorption element 66. In a crash situation, the engagement element 33 can thus bend or plastically deform the energy absorption element 66. Correspondingly, the connecting part 71, guided in the longitudinal direction parallel to the longitudinal axis L in the slot 82 of the retaining profile 81, can engage by the second driver element 74 behind the driver hook 64b of the energy absorption element 64. Here, in a crash situation, the connecting part 71 can bend, in particular plastically deform, the energy absorption element 64. Furthermore, there can additionally be provision that the slot 82 is widened, that is to say is plastically deformed, by the driver element 77 of the engagement element 33 in the crash situation due to the displacement of the engagement element 33 relative to the retaining profile 81 and thus likewise absorb energy.

Figure 5:
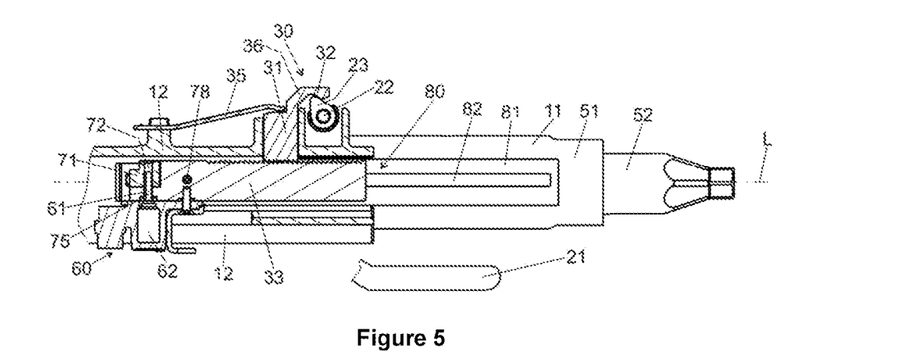
FIG. 5 is a side view of the steering column as per FIG. 1 with the clamping device and the fixing device in a fixing position of the arresting element.

FIG. 5 shows the actuator unit 11, the energy absorption device 80, a fixing device 30 and a coupling device 60. As described above, the fixing device 30 has an arresting element 31 which is arranged in the retaining unit 12 as per FIG. 1 and FIG. 2. Furthermore, the fixing device 30 comprises, as described above, the engagement element 33 which is connected to the actuating unit 11 with the interposition of the energy absorption device 80.

It can be seen from FIG. 5 that a spring element 35 is provided on the retaining unit 12. The spring element 35 can here be provided on the retaining unit 12 in such a way that the spring element 35 is connected to the retaining unit 12 in a force-fitting and/or form-fitting manner. The spring element 35 can be formed by a spring tongue. Furthermore, the spring element 35 can also be formed by a spring bar. It is also conceivable for the spring element 35 to be formed by a leaf spring. Furthermore, it is possible that the spring element 35 is formed by a spiral spring or a disk spring.

The spring element 35 as per FIG. 5 has an elongate design form and is formed from spring steel. The spring element 35 is designed to be angled at a clamped-in position on the retaining unit 12. Furthermore, the spring element 35 has a free end in contact with the arresting element 31. The spring element 35 has a bent design form in the contact region with the arresting element 31. Here, the free end of the spring element 35 is of bent configuration. The free end of the spring element 35 has a material bend.

The arresting element 31 is arranged in the retaining unit 12 so as to be height-displaceable, in particular liftable, in a direction transversely to the longitudinal axis L. Here, the arresting element 31 is arranged in the retaining unit 12 in such a way that the arresting element 31 is guided in a height direction H. The arresting element 31 is arranged in the retaining unit 12 in such a way that the arresting element 31 is fixed against displacement in the direction of the longitudinal axis L.

The arresting element 31 has substantially a cross-sectionally rectangular basic body. The rectangular basic body of the arresting element 31 has first form-fitting means 31a in an engagement region. Here, the first form-fitting means 31a are formed by a toothing. The toothing can be formed by a sawtooth toothing. The arresting element 31 further has an arresting lever 36 which is designed to project from the basic body of the arresting element 31. The arresting lever 36 is formed on the arresting element 31 in such a way that the arresting lever 36 extends from the basic body of the arresting element 31 in the direction of the longitudinal axis L. The arresting lever 36 is hook-shaped in form. The arresting lever 36 can have resilient properties. The arresting lever 36 can be elastically deformable, in particular clampable. The arresting lever 36 is preferably designed to be rigid. The arresting lever 36 has a free end on which a guide track 32 is formed. The guide track 32 will be discussed in more detail later in FIG. 6.

The engagement element 33 has an elongate design form. Furthermore, the engagement element 33 comprises a rectangular cross-sectional shape. The engagement element 33 has second form-fitting means 33a on a side facing the arresting element 31. Here, the second form-fitting means 33a are formed by a toothing. The toothing of the second form-fitting means 33a is designed here to be complementary to the first form-fitting means 31a of the arresting element 31. The arresting element 31 can therefore be brought by the first form-fitting means 31a into engagement with the second form-fitting means 33a of the engagement element 33. The arresting element 31 can thus be connected to the engagement element 33 in a form-fitting manner.

As described above, the spring element 35 has a free end in contact with the arresting element 31. Here, the spring element 35 presses the arresting element 31 against the engagement element 33. The arresting element 31 can thus be releasably connected to the engagement element 33 in a force-fitting and form-fitting manner. The spring element 35 acts on a material step of the arresting element 31 for preloading the arresting element 31 against the engagement element 33.

According to FIG. 5, the arresting element 31 is shown in the fixing position. The arresting element 31 is here connected to the engagement element 33 in a force-fitting and form-fitting manner. The clamping lever 21 is situated in a locking position in which no length adjustment of the steering column for positioning the steering wheel is possible. The fixing position of the arresting element 31 represents the normal operation.

Figure 6:
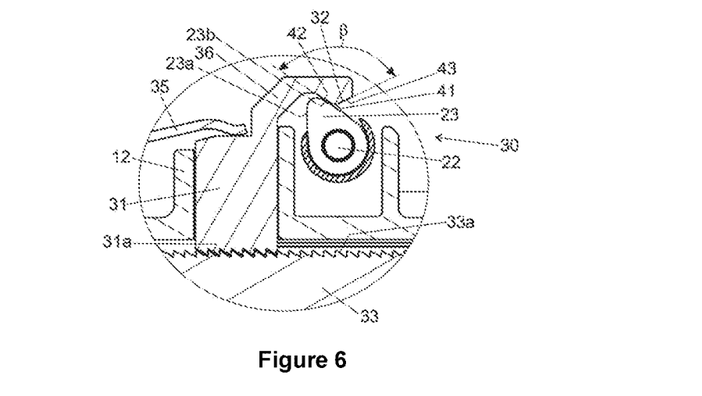
FIG. 6 is a detail view of the fixing position of the arresting element as per FIG. 5.

FIG. 6 shows a detail view of the clamping device 20, which interacts with the fixing device 30. As described above, the arresting element 31 has an arresting lever 36 with a guide track 32. The guide track 32 comprises a first ramp region 42, a second ramp region 43 and a transition region 41 situated therebetween. The first ramp region 42 and the second ramp region, starting from the transition region 41 situated therebetween, are geometrically rising in form. By virtue of the first ramp region 42 and the second ramp region, the guide track 32 is V-shaped in form.

The first ramp region 42 is formed by a first rising ramp 42a. The second ramp region 43 is formed by a falling ramp 43a. The guide track 32 is thus V-shaped in form by virtue of the first rising ramp 42a and the falling ramp 43a. The gradient of the rising ramp 42a is opposite to the gradient of the falling ramp 43a, with the result that the value of the gradient of the rising ramp 42a has an opposite sign to the value of the gradient of the falling ramp 43a, that is to say that the value of the one gradient is positive and the value of the other gradient is negative. The terms "falling" and "rising" are thus to be understood in such a way that the ramps have gradients with different signs, and therefore these terms could also be interchanged without changing the solution according to the invention.

The rising ramp 42a is referred to as a rising ramp since, by virtue of this ramp 42a, the arresting element 31 is lifted in interaction with the cam 23. From a geometric viewpoint, the rising ramp 42a is equally rising in form starting from the transition region 41. The falling ramp 43a is referred to as a falling ramp since, by virtue of this ramp 43a, the arresting element 31 is lowered in interaction with the cam 23. Here, from a geometric viewpoint, the falling ramp 43a is geometrically rising in form starting from the transition region 41.

The transition region 41 has a point in which the gradient assumes the value zero and thus forms an extreme point or apex point, in which the movement direction of the arresting element is reversed, and thus forms a dead center with respect to the movement of the arresting element 31. The values of the gradient of a, for example, curved ramp can be determined by a tangent applied to a respective point of the ramp and determining the gradient of the tangent, or by a mathematical differentiation of an equation which determines the guide track of the ramp, as is known to a person skilled in the art from the mathematical subfield of analysis.

The first rising ramp 42a is formed, starting from the transition region 41, in the direction of the basic body of the arresting element 31. Furthermore, the falling ramp 43a is formed, starting from the transition region 41, in the direction of the free end of the arresting lever 36. The ramps 42a, 43a are therefore formed in opposite directions on the arresting lever 36 from the transition region 41 and thus have gradients with different signs. The first rising ramp 42a, the falling ramp 43a and the transition region 41 form an arresting nose.

The cam 23 of the clamping device 20 is arranged in the retaining unit 12 in such a way that the cam 23 can interact with the guide track 32 by way of a cam contour. The cam 23 is connected to the clamping shaft 22 in a rotationally fixed manner. Furthermore, the clamping device 20 has a clamping sleeve which encloses the cam 23 in certain portions.

Furthermore, the first ramp region 42 and the second ramp region 43 have an angle β to one another which is less than 150°. Here, the angle β can be between 80° and 140°. In other words, the first rising ramp 42a and the falling ramp 43a have an angle β to one another which is less than 150°. It is conceivable here for the first rising ramp 42a to have a larger gradient angle than the falling ramp 43a. The gradient angle is measured here from an imaginary reference plane which lies horizontally tangentially on the transition region 41. The reference plane is here oriented parallel to the longitudinal axis L which can be seen in FIG. 5.

Figure 7:
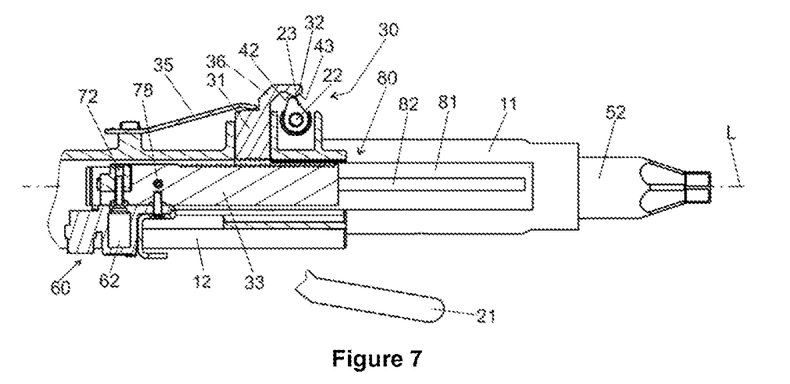
FIG. 7 is a side view of the steering column as per FIG. 1 during the transfer of the arresting element from the fixing position into a release position.

FIG. 7 shows the arresting element 31 during a transfer from the fixing position into the release position. The cam 23 of the clamping device 20 is rotated in such a way that the cam 23 has a cam tip interacting with the transition region 41 of the guide track 32 of the arresting element 31. The clamping lever 21 is situated here in an intermediate position. As is clearly evident from FIG. 7, the arresting element 31 is decoupled from the engagement element 33. Here, the cam 23 interacts with the guide track 32 of the arresting element 31 in such a way that the arresting element 31 is lifted, in particular released, in a direction transversely to the longitudinal axis L. In this case, the arresting element 31 has the first form-fitting means 31a decoupled from the second form-fitting means 33a of the engagement element 31 in terms of the form fit. In FIG. 7, the arresting element 31 is situated at dead center; it is thus lifted as far as possible and is as far away as possible from the engagement element 33.

Figure 8:
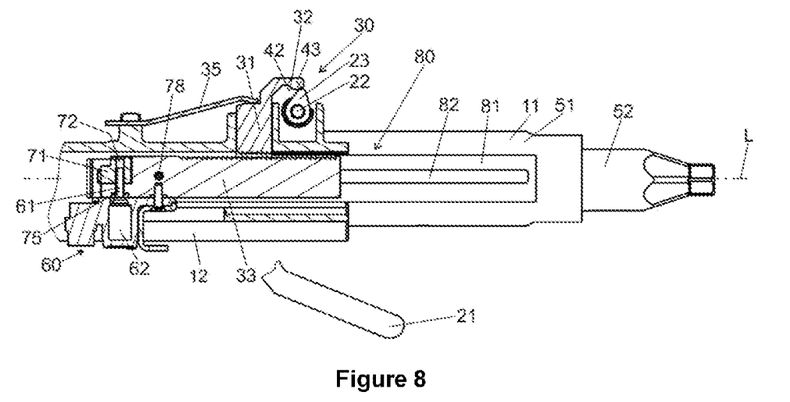
FIG. 8 is a side view of the steering column as per FIG. 1 with the clamping device and the fixing device in the release position of the arresting element.

By virtue of the stroke movement of the arresting element 31 toward the spring element 35 starting from the engagement element 33, the preloading force of the spring element 35 is increased. If the clamping lever 21 is rotated further, the cam 23 slides by way of the cam tip over the transition region 41 in the direction of the falling ramp 43a of the second ramp region 43, with the result that the arresting element 31 moves again toward the engagement element 33, that is to say in this case is lowered downward again. The increased spring force as a result of the stroke movement of the arresting element 31 causes the cam 23, under spring force assistance, to be rotated by the spring force into the release position of the arresting element 31. The release position of the arresting element 31 and the release position of the clamping lever 21 are shown in FIG. 8.

During the transfer of the cam 23 from the transition region 41 in the second ramp region 43, the spring force of the spring element 35 acts in a force-assisting manner. The cam 23 is held fixed in position in the release position of the arresting element 31 by the falling ramp 43a of the second ramp region 43.

In the release position, the arresting element 31 is force-decoupled from the engagement element 33, in other words they are not in engagement. In the release position, the arresting element 31 is force-decoupled or mechanically separated from the engagement element 33. In the release position, the clamping lever 21 is situated in its release position for length adjustment of the steering column 10.

Figure 9:
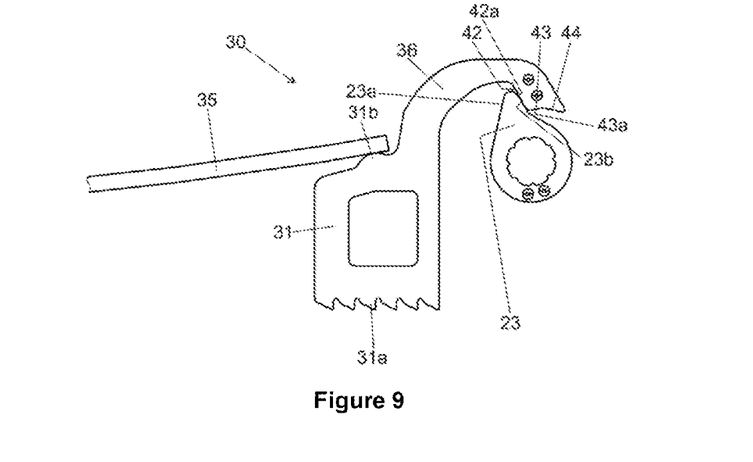
FIG. 9 is a side view of the arresting element, of a cam and of a spring element for the steering column as per FIG. 1, according to a further preferred exemplary embodiment.

FIG. 9 shows the arresting element 31, the cam 23 and the spring element 35 according to a further exemplary embodiment according to the invention. By contrast with the arresting element 31 as described in FIG. 5 and FIG. 6, the arresting element 31 according to FIG. 9 has a through-opening in the basic body of the arresting element 31. Here, the through-opening is designed to be substantially rectangular. This has the advantage that material and weight are saved. Furthermore, it is advantageous that additional installation space is created in which further fastening elements or functional elements can be arranged.

Furthermore, the arresting element 31 has a material projection 31b on which the spring element 35 acts. Here, the material projection 31b is arranged on the material step of the basic body of the arresting element 31. The material projection 31b can also be formed on the arresting element 31 at another nonstated position.

Unlike the spring element 35 according to FIG. 5 and FIG. 6, the spring element 35 according to FIG. 9 is of rectilinear design. In other words, the spring element 35 according to FIG. 9 does not have a bent shape at the free end. The material projection 31b can be formed on the arresting element 31 in such a way that the spring element is in point contact with the arresting element 31. Furthermore, the material projection 31b can be formed on the arresting element 31 in such a way that the spring element 35 is in linear contact with the arresting element 31. Here, the material projection 31b can have a linear bearing surface. The material projection 31b can also have a bearing point. The material projection 31b is formed on the arresting element 31 in such a way that improved introduction of spring force from the spring element 35 onto the arresting element 31 is achieved.

Furthermore, the arresting element 31 according to FIG. 9 has, unlike the arresting element 31 according to FIGS. 5 and 6, a second ramp region 43 which has a second rising ramp 44. The second rising ramp 44 is also formed at the free end of the arresting lever 36 of the arresting element 31. The second rising ramp 44 forms, with the falling ramp 43*a*, a material indentation at the free end of the arresting lever 36. The material indentation can be configured in such a way that the free end of the arresting lever 36 has a trough-shaped concavity. If the cam 23 is rotated into the release position of the arresting element 31, the cam 23 is held fixed in position by the cam tip in the indentation of the free end of the arresting lever 36.

Unlike the cam 23 according to FIGS. 5 to 8, the cam 23 according to FIG. 9 has a first cam contour 23*a* and a second cam contour 23*b*. The second cam contour 23*b* of the cam 23 interacts with the first ramp region 42 to securely decouple the arresting element 31 from the engagement element 33. The second cam contour 23*b* of the cam 23 is formed by a material constriction of the cam 23. The material constriction is formed in such a way that the cam 23 is of asymmetric design. The cam 23 can also have a symmetrical cam shape, as is shown in FIGS. 5 to 8. The second cam contour 23*b* of the cam 23 can be formed in such a way that, upon an interaction of the cam 23 with the guide track 32, the second cam contour 23*b* is in surface contact with the first rising ramp 42*a*. It is also conceivable for the second cam contour 23*b* of the cam 23 to be formed in such a way that, upon an interaction with the first rising ramp 42*a*, the cam contour 23*b* is in linear contact and/or point contact. If the cam 23 is therefore rotated by way of the second cam contour 23*b* to transfer the arresting element 31 into the release position, the second cam contour 23*b* slides on the guide track 32. The cam 23 is arranged on the clamping device 20 with the second cam contour 23*b* facing the free end of the arresting lever 36. Here, the second cam contour 23*b* acts on the first ramp region 42 and is moved over the transition region 41 in the direction of the second ramp region 43.

In the position in which the cam tip of the cam 23 is in contact with the transition region 41, the spring force acts with assistance during the opening of the clamping lever 21. In other words, the actuation of the clamping lever 21 is assisted by the spring force and the falling ramp 43*a*. During the transfer of the arresting element 31 from the fixing position into the release position, the vehicle occupant has the feeling that the clamping lever 21 is pulled into the opening position or the release position by the spring force. Furthermore, during the closing of the clamping lever 21 or during the transfer of the arresting element 31 from the release position into the fixing position, the vehicle occupant has the feeling that only a small actuating force is required by virtue of the first cam contour 23*a*. This ensures improved handling of the opening and closing of the clamping lever 21. A simple and quick adjustment with improved handling of the clamping lever 21 is thus achieved.

LIST OF REFERENCE SIGNS

10 Steering column
11 Actuating unit
12 Retaining unit
20 Clamping device
21 Clamping lever
22 Clamping shaft
23 Cam
23*a* First cam contour
23*b* Second cam contour
24 Tilting pin arrangement
25 Support disk
30 Fixing device
31 Arresting element
31*a* First form-fitting means
31*b* Material projection
32 Guide track
33 Engagement element
33*a* Second form-fitting means
34 Spring element
35 Further spring element
36 Arresting lever
41 Transition region
42 First ramp region
42*a* First rising ramp
43 Second ramp region
43*a* Falling ramp
44 Second rising ramp
51 Casing tube
51*a* Receiving opening
52 Steering spindle
53 End of the steering spindle
54 Retaining element
54*a* Fastening means
55, 56 Side cheeks
57 Oblong hole
58 Opening
60 Coupling device
61 Coupling element
62 Pyroelectric actuator
63 Inner profile
64, 66 Energy absorption element
64*a*, 66*a* Engagement opening
64*b*, 66*b* Driver hook
71 Connecting part
72 Form-fitting opening
73 First positioning element
79 Second positioning element
74 Second driver element
77 First driver element
75 Form-fitting opening
76 Fastening opening
78 78 Shear bolt
80 Energy absorption device
81 Retaining profile
81*a* Form-fitting element
82 Slot
L Longitudinal axis
H Height direction

What is claimed is:

1. A steering column for a motor vehicle, comprising:
an actuating unit having a casing tube in which a steering spindle is mounted so as to rotate about a longitudinal axis of the casing tube;
a retaining unit configured to connect to the motor vehicle and in which the actuating unit is displaceably arranged;
a clamping device configured to fix the actuating unit with respect to the retaining unit, wherein the clamping device comprises a clamping lever and a clamping shaft which are coupled to one another in a rotationally fixed manner, and the clamping shaft has a cam which is connected to the clamping shaft in a rotationally fixed manner;

a fixing device which comprises an arresting element, which is arranged in the retaining unit, and an engagement element which is connected to the actuating unit, wherein the cam is operationally engaged with a guide track of the arresting element such that the arresting element is brought into engagement with the engagement element by a rotary movement of the cam;

wherein the guide track has a first ramp region, a second ramp region and, situated therebetween, a transition region starting from which the ramp regions are formed, wherein the first ramp region is a first rising ramp, and the second ramp region comprises a falling ramp and a second rising ramp.

2. The steering column of claim 1 wherein the first rising ramp and the falling ramp have an angle to one another which is less than 150°.

3. The steering column of claim 1 wherein a spring element is positioned and configured to preload the arresting element.

4. The steering column of claim 3 wherein the arresting element has a material projection on which the spring element acts.

5. The steering column of claim 4 wherein the material projection is configured such that the spring element is in point contact and/or in linear contact with the arresting element.

6. The steering column of claim 1 wherein the arresting element has a first form-fitting means, and the engagement element has a second form-fitting means, wherein the first and second form-fitting means are positioned and configured to be brought into mutual engagement by a stroke movement of the arresting element.

7. The steering column of claim 1 wherein the arresting element is configured to be releasably connected to the engagement element in a force-fitting and form-fitting manner.

8. The steering column of claim 1 wherein the cam has a first cam contour and a second cam contour which interacts with the first ramp region for securely decoupling the arresting element from the engagement element.

9. The steering column claim 1 wherein the engagement element is connected to the actuating unit with the interposition of an energy absorption device.

10. A steering column comprising:
an actuating unit having a casing tube in which a steering spindle is mounted so as to rotate about a longitudinal axis;
a retaining unit that is connectable to a motor vehicle, wherein the actuating unit is displaceably arranged in the retaining unit;
a clamping device configured to fix the actuating unit relative to the retaining unit, wherein the clamping device comprises a clamping lever coupled to a clamping shaft in a rotationally fixed manner, wherein the clamping shaft has a cam that is connected to the clamping shaft in a rotationally fixed manner; and
a fixing device that comprises an arresting element and an engagement element, with the engagement element being connected to the actuating unit, wherein the cam of the clamping shaft is operationally engaged with a guide track of the arresting element such that the arresting element is brought into engagement with the engagement element by rotary movement of the cam, wherein the arresting element is prevented from rotating and is configured to translate towards and away from the engagement element.

11. The steering column of claim 10 wherein the guide track has a first ramp region, a second ramp region and, situated therebetween, a transition region starting from which the ramp regions are formed, wherein the first ramp region is a first rising ramp, wherein the second ramp region comprises a falling ramp.

12. The steering column of claim 10 wherein a driver element of the engagement element is disposed in a slot of the casing tube, wherein the driver element of the engagement element is configured to move in the slot of the casing unit in a crash event, plastically deforming the slot to lessen an impact of the crash event.

13. The steering column of claim 10 wherein teeth of the engagement element are configured to engage directly with teeth of the arresting element.

14. The steering column of claim 13 wherein the teeth of the arresting element are sawtooth teeth.

15. The steering column of claim 10 comprising a pyroelectric actuator and an energy absorption device, wherein the pyroelectric actuator selectively deactivates the energy absorption device.

16. A steering column comprising:
an actuating unit having a casing tube in which a steering spindle is mounted so as to rotate about a longitudinal axis;
a retaining unit that is connectable to a motor vehicle, wherein the actuating unit is displaceably arranged in the retaining unit;
a clamping device configured to fix the actuating unit relative to the retaining unit, wherein the clamping device comprises a clamping lever coupled to a clamping shaft in a rotationally fixed manner, wherein the clamping shaft has a cam that is connected to the clamping shaft in a rotationally fixed manner;
a fixing device that comprises an arresting element and an engagement element, with the engagement element being connected to the actuating unit, wherein the cam of the clamping shaft is operationally engaged with a guide track of the arresting element such that the arresting element is brought into engagement with the engagement element by rotary movement of the cam; and
an energy absorption device that is disposed on the casing tube and is independent of the arresting element.

17. The steering column of claim 16 wherein the guide track has a first ramp region, a second ramp region and, situated therebetween, a transition region starting from which the ramp regions are formed, wherein the first ramp region is a first rising ramp, wherein the second ramp region comprises a falling ramp.

18. The steering column of claim 16 wherein teeth of the engagement element are configured to engage directly with teeth of the arresting element.

19. The steering column of claim 16 comprising a pyroelectric actuator and an energy absorption device, wherein the pyroelectric actuator selectively deactivates the energy absorption device.

* * * * *